US006189041B1

(12) United States Patent
Cox et al.

(10) Patent No.: US 6,189,041 B1
(45) Date of Patent: Feb. 13, 2001

(54) NEXT HOP RESOLUTION PROTOCOL CUT-THROUGH TO LANS

(75) Inventors: Norman Eugene Cox; Russell Eugene Gardo, both of Raleigh; Stephen W. Piucci, Cary; Sonia K. Rovner, Chapel Hill, all of NC (US)

(73) Assignee: International Business Machines Corporation, Armonk, NY (US)

( * ) Notice: Under 35 U.S.C. 154(b), the term of this patent shall be extended for 0 days.

(21) Appl. No.: 08/968,354

(22) Filed: Nov. 12, 1997

(51) Int. Cl.$^7$ ............................ G06F 15/16; G06F 15/173
(52) U.S. Cl. ........................... 709/238; 709/237; 709/244
(58) Field of Search ..................................... 709/216, 219, 709/223, 237, 238, 244; 370/230, 238, 355, 356, 395, 398, 399

(56) References Cited

U.S. PATENT DOCUMENTS

| | | | |
|---|---|---|---|
| 5,583,862 | * 12/1996 | Callon ................................. | 370/397 |
| 5,708,654 | * 1/1998 | Arndt et al. ........................ | 370/242 |
| 5,752,003 | * 5/1998 | Hart ................................... | 709/223 |
| 5,809,233 | * 9/1998 | Shur ................................... | 709/230 |
| 5,818,842 | * 10/1998 | Burwell et al. .................... | 370/397 |
| 5,822,320 | * 10/1998 | Horikawa et al. ................. | 370/396 |
| 5,828,844 | * 10/1998 | Civanlar et al. ................... | 709/228 |
| 5,835,481 | * 11/1998 | Akyol et al. ....................... | 370/216 |
| 5,844,903 | * 12/1998 | Terashita et al. .................. | 370/403 |
| 5,878,043 | * 3/1999 | Casey ................................. | 370/397 |
| 5,878,212 | * 3/1999 | Civanlar et al. ................... | 709/203 |
| 5,909,441 | * 6/1999 | Alexander, Jr. et al. .......... | 370/395 |
| 5,909,446 | * 6/1999 | Horikawa et al. ................. | 370/469 |
| 5,917,825 | * 6/1999 | Cohen ................................ | 370/401 |
| 5,958,018 | * 9/1999 | Eng et al. .......................... | 709/246 |
| 5,982,773 | * 11/1999 | Nishimura et al. ................ | 370/395 |
| 6,006,272 | * 12/1999 | Aravamudan et al. ............ | 709/245 |
| 6,016,319 | * 1/2000 | Kshirsagar et al. ............... | 370/410 |

OTHER PUBLICATIONS

Troung et al., "LAN Emulation on an ATM Network", IEEE Communications Magazine, pp. 70–85, May 1995.*
Chaudhry, "Classical IP: IP Over ATM Achitecture for ATM Networks", IEEE, pp. 2–5, Mar. 1996.*
Driscoll et al., "Performance Comparison Between ATM LAN Emulation, Classical IP over ATM, and Native ATM in a Multi–Platform Multi–Operating System Environment", IEEE, pp. 434–438, Jun. 1997.*
Le Boudec et al., "Flight of the Falcon", IEEE Communications Magazine, pp. 50–56, Feb. 1993.*
Schneider et al., "Management of Virtual Private Networks for Integrated Broadband Communication", ACM SIGCOMM'93, pp. 224–237, Sep. 1993.*
Konstantinidou, "Segment router: a novel router design for parallel computers", ACM SPAA 94, pp. 364–373, Sep. 1994.*
Rajagopalan, "Mobility Management in Integrated Wireless–ATM Networks", ACM MOBICOM 95, pp. 127–134, Feb. 1995.*

* cited by examiner

Primary Examiner—Mark Rinehart
Assistant Examiner—Jason D. Cardone
(74) Attorney, Agent, or Firm—Winstead Sechrest & Minick

(57) ABSTRACT

A method is implemented by which a Logical IP subnetwork attached (LIS) Next Hop Resolution Protocol (NHRP) client or an Emulated LAN (ELAN) subnetwork attached NHRP client in an Asynchronous Transfer Mode (ATM) network can send data to a destination LAN Emulation Client (LEC) on a different ISO layer-3 subnetwork via a data-direct Virtual Channel Connection. The method enables such a IP subnetwork attached NHRP clients to obtain the ATM address corresponding to the destination station by using the vendor-private extension within an NHRP packet. The NHRP client uses the ATM address to build a data-direct VCC over which it unicasts data bound for the destination station. The NHRP client appears to the destination LEC as any other LEC on its ELAN would appear.

30 Claims, 6 Drawing Sheets

FIG. 1 (Prior Art)

| 7 | APPLICATION LAYER | PROVIDES A MEANS FOR APPLICATION PROCESS TO COMMUNICATE WITH ONE ANOTHER THROUGH THE OSI SYSTEM. CONTAINS MANAGEMENT FUNCTIONS TO SUPPORT DISTRIBUTED APPLICATIONS. |
|---|---|---|
| 6 | PRESENTATION LAYER | PROVIDES REPRESENTATION OF INFORMATION TO APPLICATION LAYERS IN A WAY THAT PRESERVES THE MEANING WHILE RESOLVING ANY DIFFERENCES IN FORMAT AND DATA REPRESENTATION BETWEEN THE APPLICATION SYSTEMS. |
| 5 | SESSION LAYER | PROVIDES THE MEANS NECESSARY TO COORDINATE DIALOGUE BETWEEN PRESENTATION ENTITIES. |
| 4 | TRANSPORT LAYER | PROVIDE END-TO-END CONTROL TO ALLOW FOR ERROR RECOVERY AND DETECTION TO THE HIGHER LAYERS. |
| 3 | NETWORK LAYER | ESTABLISHES, MAINTAINS, AND TERMINATES NETWORK CONNECTIONS BETWEEN END SYSTEMS. RESPONSIBLE FOR CONTROLLING THE FLOW OF DATA TO THE NETWORK. |
| 2 | LINK LAYER | PROVIDES SYNCHRONIZATION AND ERROR CONTROL FOR INFORMATION TRANSMITTED OVER THE PHYSICAL LINK. |
| 1 | PHYSICAL LAYER | PROVIDES ELECTRICAL, MECHANICAL, FUNCTIONAL, AND PROCEDURAL CHARACTERISTICS REQUIRED FOR THE PHYSICAL LINK. |

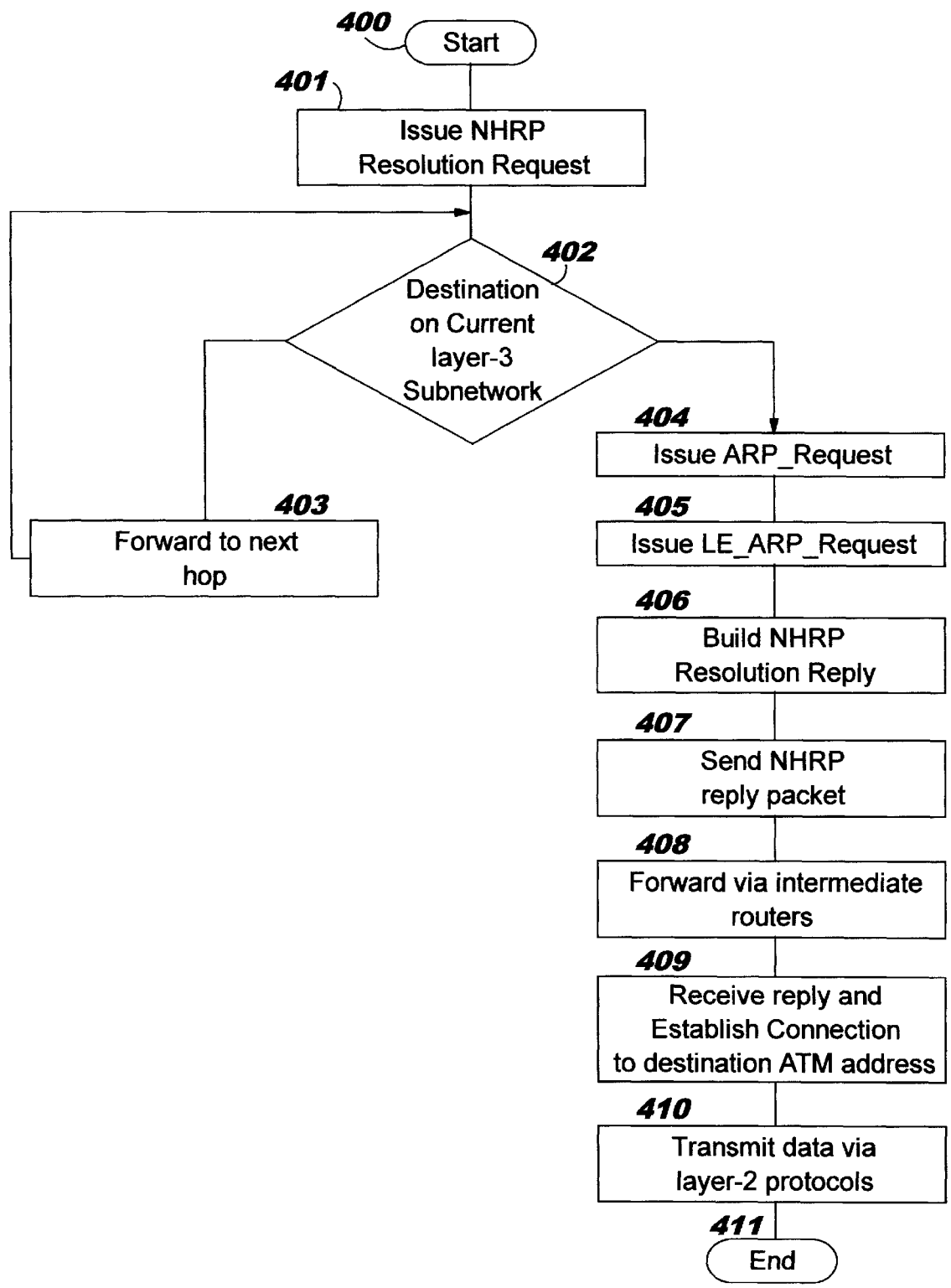

FIG. 5

| 0 | 1 | 2 | 3 |
|---|---|---|---|
| 0 1 2 3 4 5 6 7 8 9 | 0 1 2 3 4 5 | 6 7 8 9 0 1 2 3 4 5 | 6 7 8 9 0 1 |

| holding time (seconds) 501 | ATM address type & lengths 502 |
|---|---|
| ATM address (variable length) 503 ||
| ATM subaddress (variable length) 504 ||
| next-hop MAC address (1st 4 bytes) 505 ||
| next-hop MAC (last 2 bytes) 506 | LAN type 507 | address len=4 508 |
| next-hop protocol address (4 bytes for IP) 509 ||
| Max Frame Size of ELAN 510 | MTU 511 |
| source MAC address (1st 4 bytes) 512 ||
| source MAC (last 2 bytes) 513 | routing control (includes len) 514 |
| route designator 1 515 | route designator 2 516 |
| route designator 3 517 | ... up to 14 route designators |

NEXT HOP RESOLUTION PROTOCOL CUT-THROUGH TO LANS

CROSS REFERENCE TO RELATED APPLICATIONS

This Application for patent is related to the following application for patent assigned to a common assignee:
ROUTE SWITCHING MECHANISMS FOR SOURCE-ROUTED ATM NETWORKS, Serial No. 081,977,459 (RA9-97-066).

This cross-referenced application is hereby incorporated by reference into this Application as though fully set forth herein.

TECHNICAL FIELD

The present invention relates in general to data processing networks, and in particular, to Asynchronous Transfer Mode networks.

BACKGROUND INFORMATION

Asynchronous Transfer Mode (ATM) is an emerging network technology that is designed to transport information between communicating stations in a point-to-point fashion. The interest in ATM is its promise of high bandwidths and quality of service. ATM is a connection oriented architecture, in contrast to network architectures that are structured to broadcast data from the source to the destination. In ATM, the source negotiates a connected path to the destination before it proceeds to transmit its information to the recipient. ATM protocols (or "rules," usually implemented in software) define the communications necessary to establish the connection. An ATM attached device has an ATM address in addition to any other network addresses it might have, depending on the particular ATM configuration within which it is incorporated. Some possible configurations will be described subsequently. Once a connection is established, the source station transmits its data only to the destination (a "unicast").

In contrast to connection oriented architectures are broadcast networks. In these, data is sent from a source station to a destination station by broadcasting it to all addresses where the recipient plucks it off the network while the other stations on the network ignore traffic not bound for them. Broadcast architectures provide one motivation for structuring a "network" as a set of interconnected subnetworks or "subnets."

In a large network, the proliferation of broadcast packets would overwhelm the network. Another simply reflects the nature of the pattern of growth of network communication generally. Although a particular network may start out as a freestanding Local Area Network (LAN), eventually end-station users will probably want to avail themselves of the services available on other networks, and look to connect "their network" with other "networks." When this occurs, it is intuitive, as well as more precise, to view the resulting network structure as a set of subnets within a larger network, for example, an "internetwork." However, a station on one internetworking subnet that wishes to communicate with a destination on another subnet can only do so if there is connectivity between the subnet in which the source resides and the subnet in which the destination resides.

Communications methodologies between subnets are usually termed to as "layer-3" protocols. This refers to the layered architecture networking model of the International Standards Organization (ISO). This model is illustrated in FIG. 1. Layer-3 may sometimes be referred to as the "network" layer, and is equivalent to the "internetworking" layer in the TCP/IP model.

Connectivity between layer-3 subnets is provided by a device termed a "router." When a source station on one layer-3 subnet wishes to communicate with a destination station on another layer-3 subnet, it broadcasts the data in the usual way. However, now it is the router that plucks the data packets off the first subnet and forwards it to the destination station via the destination station's layer-3 subnet to which the router is also attached.

Numerous types of networks coexist in the data communications industry. In addition to ATM, there may be LANs, Wide Area Networks (WANs), and others. There is a need in the industry for interconnection between different network architectures and, in particular, users of preexisting LANs have a need to connect to emerging high speed network technologies, such as ATM. The need for incorporating or interfacing preexisting networks (more precisely subnetworks) into an ATM environment has led to the specification of several methodologies to support preexisting network architectures within ATM.

One such methodology is the Logical IP Subnetwork (LIS). In LIS, the ATM serves as the direct replacement for the "wires" and LAN segments connecting traditional "layer-3 " protocol source and destination stations (collectively, end-stations) and routers. In the traditional internetworking architecture, one or more LANs may be grouped into internetworking, or layer-3 , subnetworks, hereafter referred to as "subnets." Within a layer-3 subnetwork, end-stations communicate with each other by broadcasting traffic as described previously.

A LIS is simply a layer-3 subnet within an ATM network. When a station on one LIS wishes to communicate with another station in the same LIS it does so by using ATM protocols. In order to do this, it must learn the ATM address of the destination. It does this through the medium of an ATM Address Resolution Protocol Server which resolves the layer-3 address of the destination into its ATM address. The source station sends a request, an ATM Address Resolution Protocol request (ATMARP_Request), to a server in the LIS that provides the ATM address of the destination based on its layer-3 address. The layer-3 address is the address by which the destination is identified with respect to its internetworking subnet. By contrast, communication between a source on one LIS and a destination on a second LIS proceeds just as if the communicating devices were traditional LANs residing on different internetwork subnets. The traffic is sent to a router based on the layer-3 address of the destination. The router then forwards the data through the appropriate destination LIS, or to a second router if the router on the source LIS is not a member of the destination LIS.

Another methodology is the emulated LAN (ELAN) which simulates classical LAN protocols in an ATM environment. (Classical LAN protocols, for example Ethernet and Token Rings, are referred to as legacy LANs.) The protocols that provide the specification for ELANs are called LAN emulation (LANE). Layer-3 protocols run on top of ELANs just as they do in legacy LANs. Hosts attached to the ELAN include emulation software that allows them to simulate legacy LAN end stations. Such hosts are called LAN Emulation Clients (LEC). The LEC software hides the ATM from the LAN protocols within the LEC device, and a LEC can utilize those protocols as if it were a legacy LAN. A LEC can also provide a standard LAN service interface to a layer-3 entity in the same layer-3 subnet. Such a LEC is a LAN Switch that is usable to interface a legacy LAN with an ELAN.

Communication between LECs on an ELAN can be effected over the ATM. Each LEC has a physical, or Media Access Control (MAC) address associated with it, as well as an ATM address. For one LEC on a ELAN to communicate with another, it must obtain the ATM address of the destination LEC, given the destination MAC address. This address resolution is mediated through a LAN Emulation Server (LES). The source LEC issues a LANE Address Resolution Protocol Request (LE_ARP_Request) to the LES. Provided the destination station has previously registered its MAC address, ATM address pair with the LES serving the ELAN, the LES returns the ATM address of the destination to the requesting LEC in an ELAN Address Resolution Protocol Reply (LE_ARP_Reply). The source LEC can then use the ATM address to establish a connection to unicast data to the destination, a so-called data-direct Virtual Channel Connection (VCC), and transmit its data to the destination thereon.

Should the destination not have registered with the LES, the source communicates with the destination using conventional LAN methodology. This is mediated through a Broadcast and Unknown Server (BUS). The LEC sends its data to the BUS which then broadcasts it. Just as in a legacy LAN, the broadcast data is plucked from the network by the destination station, and is ignored by the other devices on the network. Exactly the same process is used if the destination is on a subnetwork, either a legacy LAN or an ELAN, in a different layer-3 subnet. In that case, the broadcast data is gathered by a router connected to the ELAN and forwarded via layer-3 protocols to the destination, as described hereinabove, just as if the ELAN were a legacy LAN. An ELAN forming a layer-3 subnetwork will be referred to as an ELAN IP subnetwork (or, equivalently, subnet).

Communication between a LIS attached station and an ELAN attached station must also proceed by router-connected paths. Without a mechanism for resolving the ATM address of a destination station, a source station attached to a LIS cannot exploit the ATM network to which it is attached, and data packets are sent to a router connecting the layer-3 subnets which forwards them via layer-3 protocols to the layer-3 subnet in which the destination station resides. The routed path through the network may involve forwarding the data from source to destination through one or more routers. A forwarding event will hereinafter be referred to as a "hop." Having data proceed from the source to the destination in this way, via a series of hops, thus subverts the benefits of the ATM switched infrastructure because the source station is not exploiting the ATM connection-oriented infrastructure.

A method in the art to bypass a hop is provided by the Next Hop Resolution Protocol (NHRP). NHRP is a protocol that allows a source station, such as a host, connected to an ATM subnetwork to determine the ATM address of the next hop associated with a destination station. The next hop may be the destination station itself or a router "nearest" the destination station that provides egress from the ATM network to, an LAN attached destination host, for example. An NHRP client is a device that has NHRP functionality, or capability, included in the software it contains, and initiates requests to access NHRP service. NHRP service is provided by an NHRP server (NHS), an entity having NHRP functionality performing NHRP services. NHRP is presently part of the specification for Multiprotocol Over ATM, Version 1.0. NHRP is Annex C, ATM Forum, AF-MPOA-0087.000, July 1997, prior art hereby incorporated herein by reference.

A source that is an NHRP client within a LIS or an ELAN IP subnetwork can bypass a hop provided the destination meets three requirements. The destination must support NHRP, it must support a Virtual Channel Connection (VCC) as defined by Request for Comments 1483 (RFC-1483), and the destination must support the NHRP registration function for NHRP clients. Unless the destination satisfies all of these, the NHRP will not bypass hops. RFC-1483 is prior art, and is hereby incorporated by reference herein.

Thus, there is a need in the art for a method by which an NHRP client in a LIS or an ELAN IP subnetwork may bypass one or more hops when the destination fails to meet all of the aforesaid conditions. One such instance occurs when one of the communicating devices is a LAN Emulation (LANE) version-1 client. In ATM networks, a set of services, functional units and protocols are provided that define a standard for LANE. LANE version-1 does not support RFC-1483 VCCs. However, the need is not limited to such a situation. The method of bypassing a hop should be able to exploit the high speed switching characteristics of the ATM infrastructure by establishing a direct layer-2 connection between the NHRP client and the LAN (legacy or emulated) destination. Moreover, in the case of an ELAN destination, the method should be independent of the implemented LANE version.

SUMMARY OF THE INVENTION

The previously mentioned needs are addressed by the present invention. The invention permits a LIS resident, or ELAN IP subnet resident, device that is an NHRP client to establish a layer-2 connection with either an ATM attached device of an ELAN or a non-ATM attached destination residing on a legacy LAN via a bridge.

The NHRP client effects the layer-2 connection by using the vendor-client extension provided in the NHRP packet structure. On receipt of an NHRP resolution request, an NHRP server gathers the same information that it would need in order to build a connection to the target destination. The NHRP server then returns this information to the NHRP client that issued the NHRP resolution request. The information is returned in the vendor-private extension that is included in the NHRP resolution reply. The NHRP client uses this information to establish a connection to the destination either directly or through a proxy in the event that the destination resides on a legacy LAN.

In an embodiment requiring multiple hops, only the ELAN attached router need recognize NHRP vendor-private extensions. NHRP requires all routers to forward all NHRP vendor-private extensions. Thus, from the perspective of the requesting NHRP client, there is no difference between a single hop route and one including multiple hops.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 schematically depicts the International Standards Organization (ISO) Reference Model of Open System Interconnection in accordance with the prior art.

FIG. 4 illustrates a flow diagram in accordance with a method of an embodiment of the present invention.

FIG. 5 schematically illustrates a vendor-private extension for LANE shortcuts in accordance with an embodiment of the present invention.

DETAILED DESCRIPTION OF THE INVENTION

Figure 2:
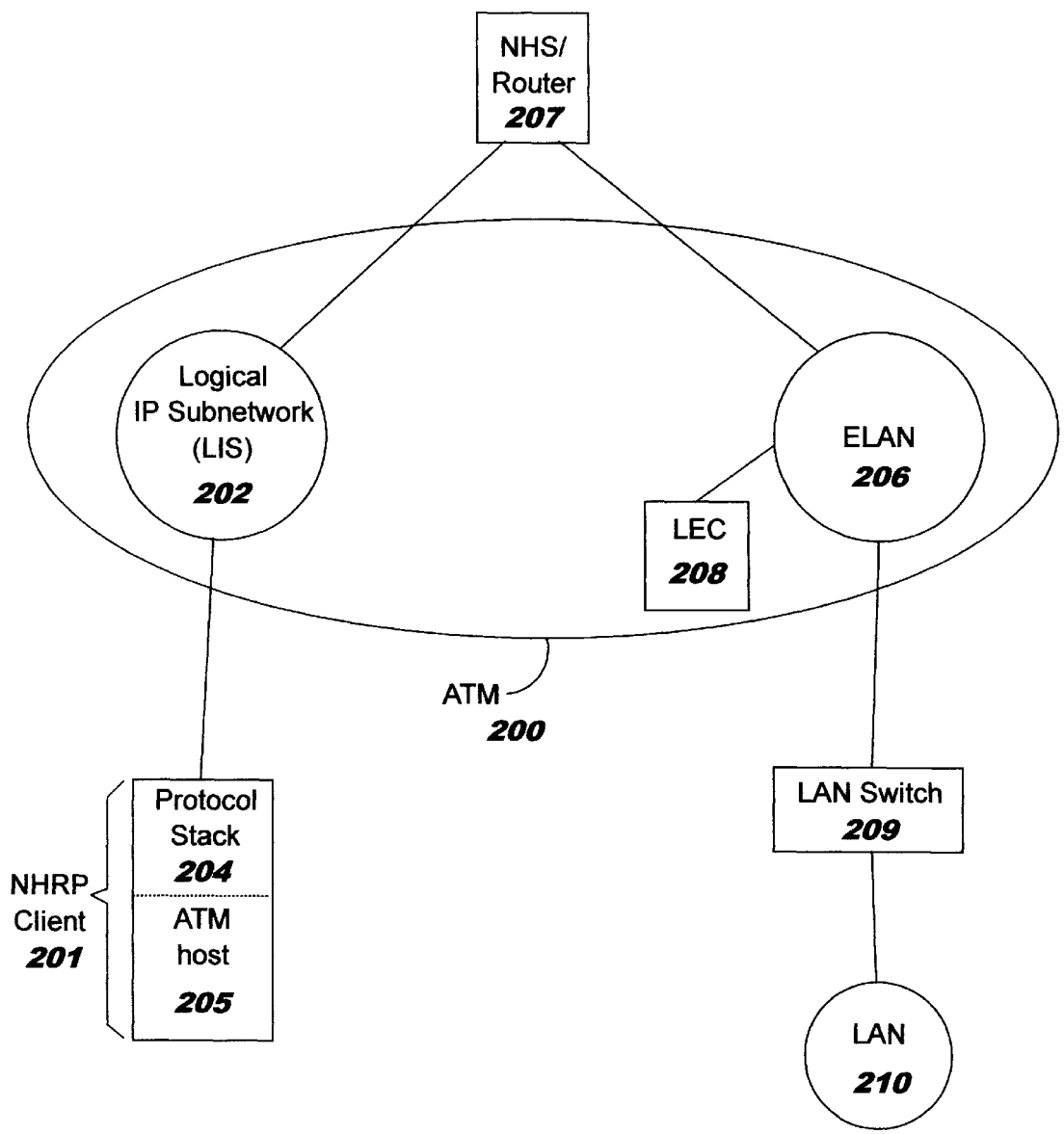
FIG. 2 schematically illustrates an embodiment of a data processing network using a method of the present invention.

In the following description, numerous specific details are set forth to provide a thorough understanding of the present invention. However, it will be obvious to those skilled in the art that the present invention may be practiced without such specific details. Refer now to the drawings wherein depicted elements are not necessarily shown to scale and wherein like or similar elements are designated by the same reference numeral through the several views.

An invention that alleviates the necessity of layer-3 routing in an ATM network by a legacy LAN attached device that is an NHRP client will now be described in detail. Refer now to FIG. 2 in which is depicted an embodiment of a data processing network, ATM Network 200, using the present invention. NHRP Client 201 resides on LIS subnet 202 within ATM Network 200. As described hereinabove, an ATM attached device that is LIS attached is native to ATM. In an embodiment of the present invention, the NHRP functionality may be incorporated in software resident in a protocol stack, here, Protocol Stack 204 within ATM Host 205. ATM Host 205 is ATM attached within LIS 202. In an embodiment of the present invention, ATM Host 205 may be a workstation, for example.

In an embodiment using the prior art, traffic from NHRP Client 201 bound for a destination residing in a different layer-3 subnet, here ELAN 206, must pass through Router 207 which provides layer-3 connectivity, that is, forwards packets based on layer-3 information, between ELAN 206 and LIS 202.

The destination may be a LAN Emulation Client (LEC), such as LEC 208 or a proxy LEC, such as LAN Switch 209. It has an ATM address as well as a Media Access Control (MAC) address, that is, the physical network address of the device. Here, LEC 208 is attached to ELAN 206. In the embodiment of FIG. 2, LAN Switch 209 bridges ELAN 206 and LAN 210. In either case, the destination may not support NHRP, may not support inbound traffic over VCCs using the protocol defined in RFC 1483, or may not have registered with an NHRP server. Then, NHRP Client 201 is unable to build an ATM connection to the destination or its proxy LEC if the destination is LAN resident. Thus, even though LIS 202 and ELAN 206 are subnets within the same ATM network, ATM 200, devices on either subnet cannot exploit ATM to communicate with devices on the other subnet because devices on one are only aware of the layer-3 addresses of the devices on the other.

The present invention utilizes the vendor-private extension within an NHRP Resolution Request enable NHRP Client 201 to establish a LANE data-direct VCC. An NHRP Resolution Request is embodied in a data packet having a structure defined in the NHRP. An NHS issues an NHRP Resolution Reply in response to an NHRP Resolution Request. The NHRP Resolution Reply is embodied in a data packet also having a structure defined in NHRP. The vendor-private extension is one of a set of extensions within the NHRP that both an NHRP Resolution Request and a NHRP Resolution Reply may include. If a NHRP Resolution Request includes a vendor-private extension, the NHRP Resolution Reply generated in response must also contain one. Otherwise, extensions are optional portions of the NHRP request and reply packets.

NHRP Client 201 issues an NHRP Resolution Request that includes the vendor-private extensions for LANE Shortcuts. An NHS must forward any NHRP extensions that are included in an NHRP packet. The NHRP Resolution Request is transmitted toward the destination via layer-3 protocols, that is, using the internetwork address of the destination. In FIG. 2, the NHRP Resolution Request is routed through NHS/Router 207.

On receiving the NHRP Resolution Request, NHS/Router 207 gathers the same information that it would need in order to establish a connection to the destination station and provides it to NHRP Client 201. NHS/Router 207 issues requests for the addresses associated with the destination station: an ARP_Request for the MAC address, and an LE_ARP_Request for the ATM address.

NHS/Router 207 builds a reply packet including vendor-private extensions for LANE Shortcuts containing these addresses, and sends the reply packet to NHRP Client 201. Vendor-private extensions for LANE Shortcuts contain the information NHRP Client 201 needs to establish to a VCC the destination and transfer data to it. The structure of a vendor-private extension for LANE shortcuts will be described subsequently.

NHRP Client 201 then transmits data directly to the ATM address associated with the destination station using layer-2 protocols. NHRP Client 201 uses the ATM address provided it in the vendor-private extension in the NHRP Resolution Reply sent by NHS/Router 207 to establish a data-direct VCC, or LANE Shortcut, to the ATM address associated with the destination station. A data-direct VCC is specified in LANE, and defines how data being sent is encapsulated, and how the VCC is established. The ATM address may be associated with an ATM attached station, such as LEC 208, if the data is bound for an ATM attached device. However, if the data to be sent by NHRP Client 201 is destined for a station not a LEC, that is it is not attached to the ATM, the ATM address associated with the destination would be that of a bridge device, such as LAN Switch 209, serving as a proxy LEC. Nevertheless, in either case, the NHRP client, such as NHRP Client 201, appears to the destination LEC as any other LEC otherwise on ELAN 206 would appear to the destination LEC.

In an alternative embodiment of the present invention, LIS 202 may be an ELAN IP subnet. The method of the present invention is unchanged in such an embodiment. In the interest of clarity and simplicity, ATM network 200 has been schematically depicted in an embodiment in which the NHRP client is LIS attached.

It is an advantage of the present invention that the only devices that need support NHRP are the source station seeking to establish a LANE Shortcut and the NHS that responds. This can be better appreciated by referring to FIG. 3 in which an alternative embodiment of a data processing network, ATM 300, using the present invention is depicted. As previously described, NHRP Client 301, on LIS 302, issues an NHRP Resolution Request for the ATM and MAC addresses associated with the destination station. The NHRP Resolution Request packets containing the vendor-private extensions are forwarded through LIS 303 and LIS 304 by Router 305 and Router 306 respectively. Router 305 provides layer-3 connectivity between LIS 303 and LIS 302 to which NHRP Client 301 is attached.

Figure 3:
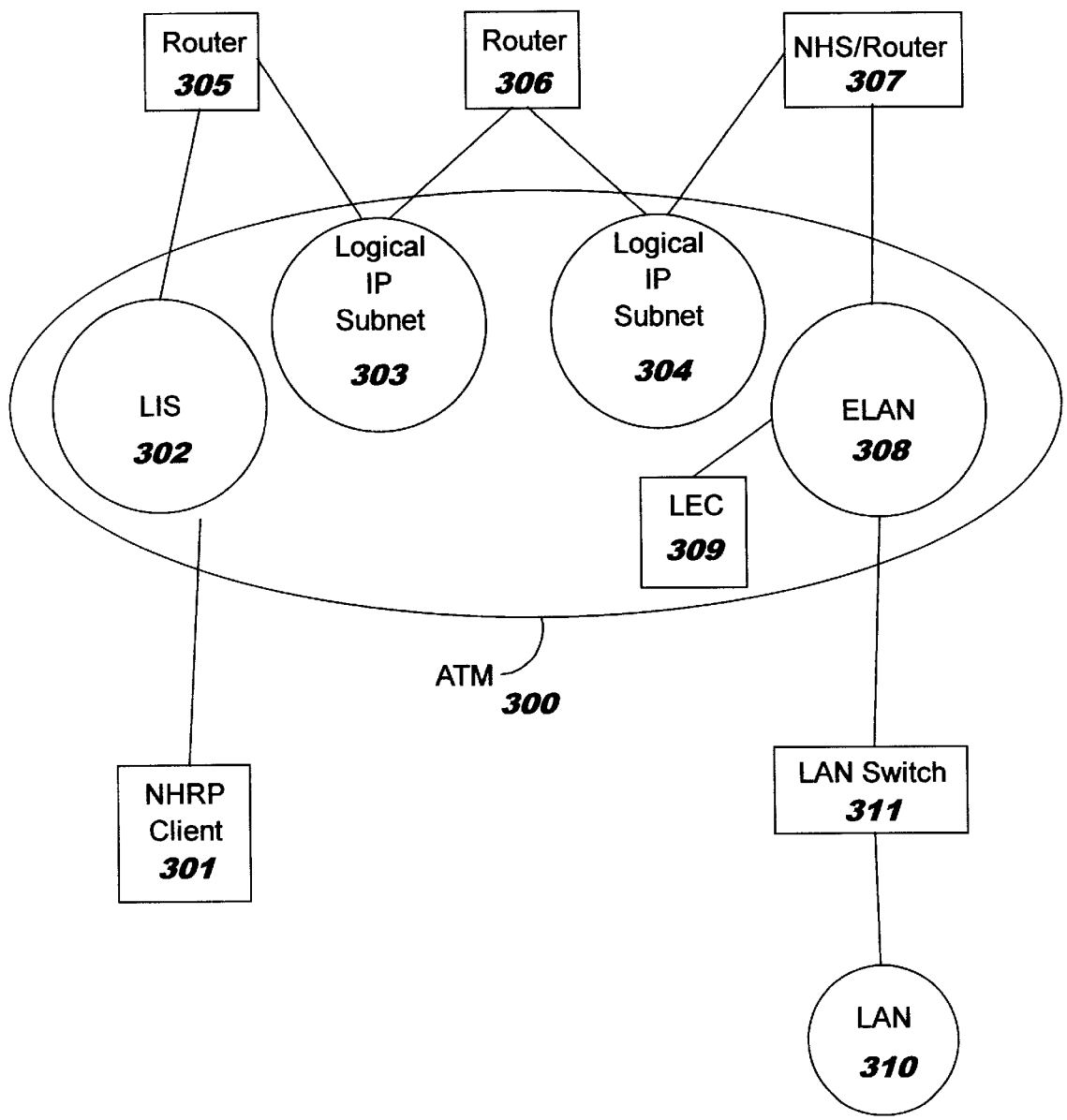
FIG. 3 schematically illustrates an alternative embodiment of a data processing network using a method of the present invention.

The packets are received by NHS/Router 307 which gathers the ATM and MAC addresses associated with the destination station as described hereinabove. These addresses are included in vendor-private extensions for LANE Shortcuts contained in the NHRP Resolution Reply prepared by NHS/Router 307 and addressed back to NHRP Client 301. The NHRP Resolution reply packets are routed back to NHRP Client 301 through LIS 303 via Router 306 and LIS 303 via Router 305. Neither Router 305 nor Router 306 need support NHRP because NHRP requires all routers to forward all NHRP vendor-private extensions. In the embodiment of FIG. 3, NHS/Router 307 is an egress router. That is, it is the router that "delivers" data packets to the layer-3 subnet including the destination. Only the egress router, here NHS/Router 307 which is attached to ELAN 308, must recognize and support vendor-private extensions.

Moreover, the ELAN attached destination, such as a destination attached to ELAN 308, does not need to support NHRP. It only responds to an ARP_Request and an LE_ARP_Request. Thus, routers, such as Router 305 and Router 306, implementing intermediate hops, those between layer-3 subnets in which neither the source nor destination reside, return the vendor-private extension in the NHRP Resolution Reply to the requesting NHRP client, such as NHRP Client 301, and the NHRP client establishes the data-direct VCC to the ATM address associated with the destination station as previously described. Then, data bound for an ELAN attached device, such as LEC 309 or LAN 310 via LAN Switch 311 on ELAN 308, is sent using layer-2 protocols as discussed hereinabove.

The invention may be better understood by referring now to FIG. 4 in which a flow chart depicting a method of bypassing router hops is shown. The method is initiated when an NHRP client, for example NHRP Client 301, has data to be sent to a destination on a different layer-3 subnetwork, step 400. The NHRP client issues an NHRP Resolution Request, step 401. The NHRP Resolution Request is transmitted via layer-3 protocols toward the destination, and each receiving router must determine whether the NHRP Resolution Request packets are bound for a destination in its layer-3 subnetwork, step 402. If the destination is not, the router forwards the packet to the next hop, step 403. If the destination is in the router's layer-3 network, then the router, through its NHS functionality, ascertains the layer-2 addresses required by the requesting NHRP client. It does this by issuing an ARP_Request for the MAC address associated with the destination host, step 404. The NHS/router then issues an LE_ARP_Request for the ATM address associated with the destination host, step 405. These addresses may be associated with an ATM attached host, such as LEC 208 or LEC 309, or a proxy LEC such as LAN Switch 209 or LAN Switch 311 if the destination is legacy LAN attached. These layer-2 addresses are then incorporated into the vendor private extensions of NHRP Resolution Reply packets that are built by the NHS/Router, step 406. The packets forming the NHRP Resolution Reply are then sent to the NHRP client that issued the NHRP Resolution Request, step 407. In an embodiment of a network having multiple hops between source and destination, such as ATM 300, the NHRP Resolution Reply packets are forwarded to the source station by intermediate routers, step 408. The NHRP client receives the NHRP Resolution Reply, and establishes a data-direct connection, a LANE "shortcut," to the ATM address received in the NHRP Resolution Reply, step 409, and transmits its data via layer-2 protocols using the MAC address included in the NHRP Resolution Reply, step 410. After all the data bound for the destination host has been transmitted, the process ends, step 411.

In the context of the present invention, the destination host need not be the ultimate destination of the data packets. The destination host may be a LEC that forwards the data to an ultimate destination that is not otherwise reachable by a LANE shortcut. An embodiment of such a LEC may be an ELAN attached router "closest" to the ultimate destination which then forwards the data via layer-3 protocols to the ultimate destination.

In an embodiment of a data processing network, having a single hop between layer-3 subnetworks, for example, ATM 200, the steps of determining whether the destination is in a current layer-3 subnetwork and forwarding to the next hop, steps 402 and 403 respectively, may be eliminated.

Embodiments of the present invention may be used with source routed ELANs. LANEs are specified both for emulation of source routed LANs, for example Token Rings, and nonsource routed LANs, such as Ethernets. The embodiments of the present invention heretofore discussed have focused on nonsource routed LAN architectures. In source routed LANs, packets being sent to a destination station contain a Routing Information Field (RIF) that includes a path from source to destination that is an ordered set of route descriptors, ring and bridge numbers, forming the route between source and destination station. An embodiment in which an ELAN, such as ELAN 206 or ELAN 308, is source routed includes a set of route descriptors within the vendor-private extension for LANE shortcuts. Routers servicing source routed layer-3 subnetworks always build an RIF. Thus, in the present invention, a router/server building the vendor-private extension for LANE shortcuts will build an RIF and then incorporate it in the vendor-private extension for LANE shortcuts. This may be better appreciated by referring now to FIG. 5 in which a vendor-private extension for LANE shortcuts is schematically illustrated.

The structure of the vendor-private extension for LANE Shortcuts is depicted in FIG. 5. In an embodiment of the present invention, vendor-private extension for LANE Shortcuts 500 includes seventeen fields having lengths as depicted in therein. Field 501 is the holding time associated with the LANE shortcut. If the connection is inactive longer than the holding time, it will be cleared. The next three fields contain data with respect to the ATM address associated with the destination station. These fields are defined in NHRP, incorporated herein by reference. The first, field 502 contains the ATM address type and length. Field 503 holds the ATM address and field 504 the ATM subaddress. The fifth and sixth fields contain the MAC address associated with the destination. Field 505 includes the first four bytes of the MAC address of the device to which the shortcut is to be established with the last two bytes contained in field 506. The LAN type field, 507, contains a designator denoting the LAN encapsulation type of the LAN in which the destination resides. The value "1" denotes a Token Ring, "2" signifies an Ethernet V2 and "3" signifies an Ethernet DIX. The next two fields relate to the layer-3 protocol address, to which the data packets should be sent. The first of these fields, 508 contains the protocol address length, in bytes, and the second, 509, contains the protocol address itself Field 510 holds the maximum frame size as defined for destination ELAN. The next field, 511, contains the Maximum Transmission Unit (MTU) which is the maximum protocol packet size that can be sent over the shortcut VCC. The twelfth and thirteenth fields contain the MAC address of the source of the vendor-private extension for LANE shortcuts; the first four bytes are contained in field 512 and the last two bytes in field 513. This is usually the MAC address of the egress NHS. The next fields are used if the ELAN emulates a source routed LAN, such as a Token Ring. The first of these, 514, contains the control field used in a Routing Information Field of a source routed LAN. The remaining fields contain route designators, usually an ordered pair of ring and bridge numbers, the bridges providing the interface between rings. The embodiment illustrated in FIG. 5, vendor-private extension for LANE Shortcuts 500 includes three route designator fields, route designator 1, field 515, route designator 2, field 516, and route designator 3, field 517. Alternative embodiments may include up to fourteen route designators.

Figure 6:
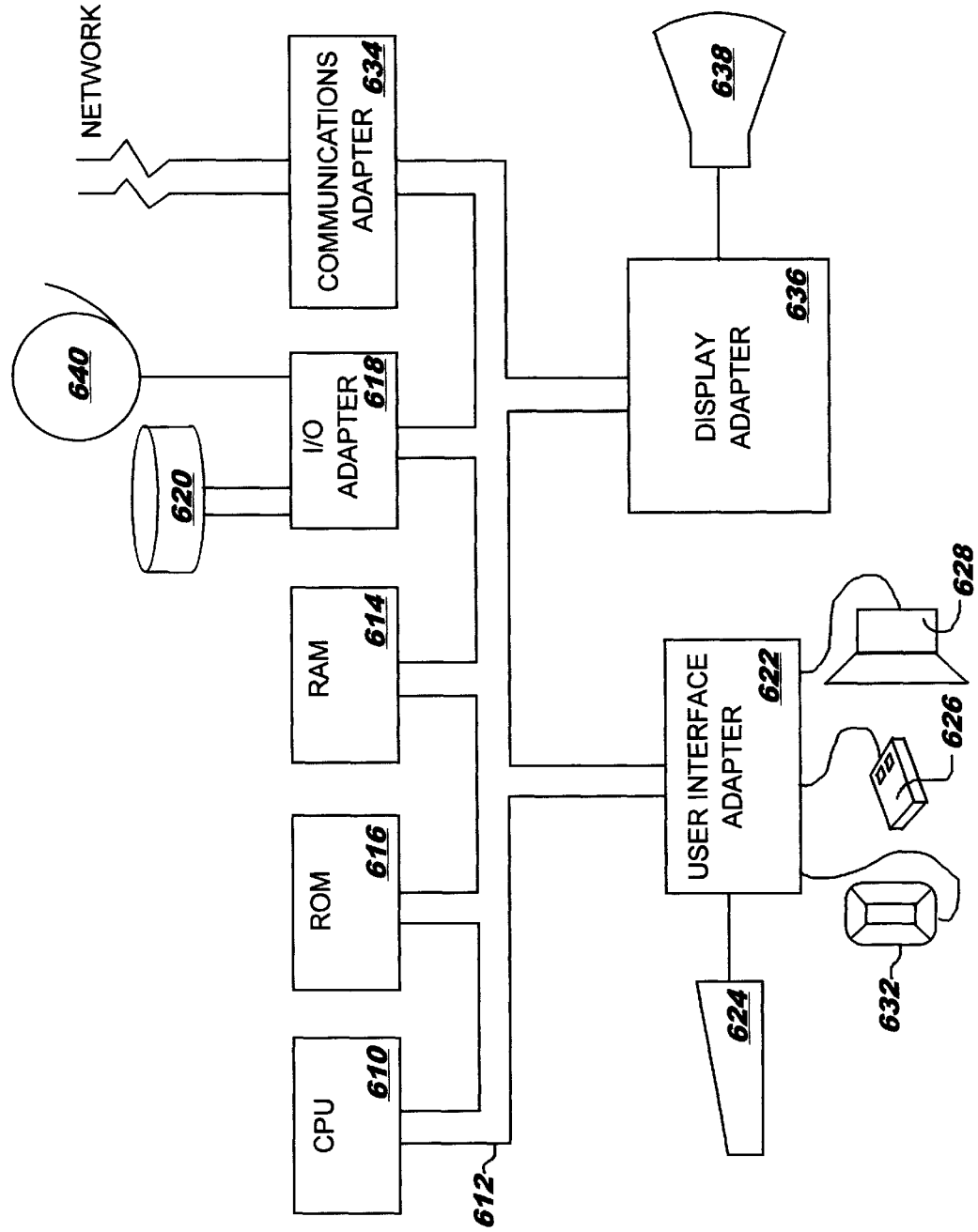
FIG. 6 illustrates a data processing system configured in accordance with an embodiment of the present invention.

A representative hardware environment for practicing the present invention in such an embodiment is depicted in FIG. 6, which illustrates a typical hardware configuration of workstation 613 in accordance with the subject invention having central processing unit (CPU) 610, such as a conventional microprocessor, and a number of other units interconnected via system bus 612. Workstation 613 includes random access memory (RAM) 614, read only memory (ROM) 516, and input/output (I/O) adapter 618 for connecting peripheral devices such as disk units 620 and tape drives 640 to bus 612, user interface adapter 622 for connecting keyboard 624, mouse 626, speaker 628, microphone 632, and/or other user interface devices such as a touch screen device (not shown) to bus 612, communication adapter 632 for connecting workstation 613 to a data processing network, and display adapter 636 for connecting bus 612 to display device 638. CPU 610 may include other circuitry not shown herein, which will include circuitry commonly found within a microprocessor, e.g., execution unit, bus interface unit, arithmetic logic unit, etc. CPU 610 may also reside on a single integrated circuit. In one embodiment, a protocol stack, for example, Protocol Stack 204 of FIG. 2 may be stored in ROM 616. In an alternative embodiment it may be located in a mass storage device, such as disk units 620. If any application being executed on workstation 613 seeks to transmit data to a LEC on an ELAN in a different layer-3 subnetwork, for example, LEC 208 of FIG. 2, an instruction set representing the NHRP within the protocol stack would be loaded into RAM 614 from ROM 616 or disk units 620, as appropriate. CPU 610 would then execute the instruction set in order to perform those steps of the NHRP that are within its scope. These steps would include step 402 of FIG. 4.

Although the present invention and its advantages have been described in detail, it should be understood that various changes, substitutions and alterations can be made herein without departing from the spirit and scope of the invention as defined by the appended claims.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A data processing system comprising:
   a first data processing device operable for attaching to a layer-3 subnetwork, said first data processing device including circuitry for sending and receiving Next Hop Resolution Protocol (NHRP) packets; and
   a second data processing device operable for attaching to said layer-3 subnetwork, said second data processing device including circuitry for sending and receiving NHRP packets,
   wherein one or more of said NHRP packets include a vendor-private extension for LANE Shortcuts.

2. The data processing system of claim 1 wherein said layer-3 subnetwork is a Logical IP Subnetwork (LIS).

3. The data processing system of claim 2 wherein said NHRP packets further comprise at least one NHRP Resolution Reply packet.

4. The data processing system of claim 1 further comprising a third data processing device, said third data processing device including circuitry for forwarding said NHRP packets, wherein said third data processing device is operable for attaching to a layer-3 subnetwork.

5. The data processing system of claim 4 wherein said third data processing device is a router.

6. The data processing system of claim 1 wherein said layer-3 subnetwork is an ELAN IP subnet.

7. The data processing system of claim 1 wherein said NHRP packets further comprise at least one NHRP Resolution Request packet.

8. The data processing system of claim 1 wherein said first data processing device is a NHRP client.

9. The data processing system of claim 1 wherein said second data processing device is operable for attaching to an ELAN.

10. The data processing system of claim 1 wherein said second data processing device is a NHRP server.

11. A program product adaptable for storage on a program storage media, the program product operable for sending and receiving NHRP packets, said program product comprising:
    programming for sending one or more NHRP Resolution Request packets wherein said NHRP Resolution Request packets include a vendor-private extension for LANE Shortcuts.

12. The program product adaptable for storage on a program storage media of claim 11 further comprising:
    programming for receiving one or more NHRP Resolution Reply packets, wherein said one or more NHRP Resolution Reply packets include said vendor-private extension for LANE Shortcuts.

13. The program product adaptable for storage on a program storage media of claim 12 further comprising:
    programming for extracting layer-2 protocol routing information from said vendor-private extension for LANE Shortcuts.

14. The program product of claim 13 further comprising:
    programming for providing said layer-2 protocol routing information to circuitry for incorporating said layer-2 protocol routing information into data packets.

15. The program product adaptable for storage on a program storage media of claim 14 wherein said layer-2 protocol routing information further comprises:
    an ATM address; and
    a MAC address.

16. The program product adaptable for storage on a program storage media of claim 14 wherein said layer-2 protocol routing information further comprises:
    an ATM address; and
    an RIF.

17. The program product adaptable for storage on a program storage media of claim 13 wherein said layer-2 protocol routing information further comprises:
- an ATM address; and
- a MAC address.

18. The program product adaptable for storage on a program storage media of claim 13 wherein said layer-2 protocol routing information further comprises:
- an ATM address; and
- an RIF.

19. A program product adaptable for storage on a program storage media, the program product operable for sending and receiving NHRP packets, said program product comprising:
- programming for receiving an NHRP Resolution Request packet including a vendor-private extension for LANE Shortcuts; and
- programming for sending one or more of said NHRP Resolution Reply packets.

20. The program product adaptable for storage on a program storage media of claim 19 further comprising:
- programming for building an NHRP Resolution Reply packet wherein said NHRP Resolution Request packet includes said vendor-private extension for LANE Shortcuts, said vendor-private extension for LANE Shortcuts including layer-2 protocol routing information associated with a destination station.

21. The program product adaptable for storage on a program storage media of claim 20 wherein said layer-2 protocol routing information further comprise:
- an ATM address; and
- a MAC address.

22. The program product adaptable for storage on a program storage media of claim 20 wherein said layer-2 protocol routing information further comprises:
- an ATM address; and
- an RIF.

23. A data processing device comprising:
- circuitry operable for attaching the data processing device to a layer-3 subnetwork; and
- circuitry for sending and receiving Next Hop Resolution Protocol (NHRP) packets via said layer-3 subnetwork, wherein one or more of said NHRP packets include a vendor-private extension for LANE Shortcuts.

24. The data processing device of claim 23 wherein said layer-3 subnetwork is a Logical IP Subnetwork (LIS).

25. The data processing device of claim 23 wherein said layer-3 subnetwork is an ELAN subnet.

26. The data processing device of claim 23 wherein said NHRP packets further comprise at least one NHRP Resolution Request packet.

27. The data processing device of claim 23 wherein said NHRP packets at least one NHRP Resolution Reply packet.

28. The data processing device of claim 23 wherein said data processing device is an NHRP client.

29. The data processing device of claim 23 further comprising circuitry operable for attaching to an emulated Local Area Network (ELAN).

30. The data processing device of claim 23 wherein said data processing device is an NHRP server.

* * * * *